United States Patent
Kim

(10) Patent No.: US 9,435,223 B2
(45) Date of Patent: Sep. 6, 2016

(54) GAS TURBINE APPARATUS

(71) Applicant: HANWHA TECHWIN CO., LTD., Changwon-si (KR)

(72) Inventor: Myeong-hyo Kim, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 679 days.

(21) Appl. No.: 13/896,483

(22) Filed: May 17, 2013

(65) Prior Publication Data

US 2014/0030067 A1 Jan. 30, 2014

(30) Foreign Application Priority Data

Jul. 25, 2012 (KR) .................. 10-2012-0081407

(51) Int. Cl.
| | | |
|---|---|---|
| *F01D 25/12* | (2006.01) | |
| *F01D 15/00* | (2006.01) | |
| *F01D 15/12* | (2006.01) | |
| *F02C 6/08* | (2006.01) | |
| *F02C 7/12* | (2006.01) | |

(52) U.S. Cl.
CPC .............. *F01D 25/12* (2013.01); *F01D 15/00* (2013.01); *F01D 15/12* (2013.01); *F02C 6/08* (2013.01); *F02C 7/12* (2013.01); *F05D 2220/40* (2013.01); *F05D 2230/72* (2013.01); *F05D 2260/4031* (2013.01)

(58) Field of Classification Search
CPC ...... F01D 15/00; F01D 15/08; F01D 17/085; F02C 7/12; F02C 7/16; F02C 7/18
See application file for complete search history.

(56) References Cited

U.S. PATENT DOCUMENTS

| | | | | |
|---|---|---|---|---|
| 5,680,752 A | * | 10/1997 | Skog | ....................... F02C 3/107 60/726 |
| 6,389,793 B1 | | 5/2002 | Priestley | |
| 6,640,550 B2 | * | 11/2003 | Hoffmann | ................. F02C 7/18 60/785 |
| 7,785,063 B2 | | 8/2010 | McQuiggan et al. | |
| 8,240,153 B2 | * | 8/2012 | Childers | ................... F02C 6/08 60/782 |
| 2012/0210723 A1 | * | 8/2012 | Wettstein | ................. F02C 3/34 60/772 |

FOREIGN PATENT DOCUMENTS

| | | |
|---|---|---|
| JP | 2001-303971 A | 10/2001 |
| KR | 2002-0030435 A | 4/2002 |
| KR | 10-2010-0106617 A | 10/2010 |

* cited by examiner

*Primary Examiner* — Eric Keasel
*Assistant Examiner* — Cameron Corday
(74) *Attorney, Agent, or Firm* — Sughrue Mion, PLLC

(57) ABSTRACT

Provided is a gas turbine apparatus including: a turbine unit comprising an output shaft; a cooling gas generation unit, comprising a rotation shaft, which receives power from the output shaft through the rotation shaft and generates a compressed cooling gas; a first duct unit which transfers the generated compressed cooling gas to the turbine unit; a clutch unit which controls a power transfer connection between the output shaft and the rotation shaft; and a control unit which controls the transferring of the generated compressed cooling gas.

17 Claims, 2 Drawing Sheets

GAS TURBINE APPARATUS

CROSS-REFERENCE TO RELATED PATENT APPLICATION

This application claims priority from Korean Patent Application No. 10-2012-0081407, filed on Jul. 25, 2012, in the Korean Intellectual Property Office, the disclosure of which is incorporated herein by reference in its entirety.

BACKGROUND

1. Field

Apparatuses consistent with exemplary embodiments relate to a gas turbine apparatus.

2. Description of the Related Art

A turbine apparatus is an apparatus for converting energy of a fluid, such as water, gas, or steam, into work.

Specifically, in a gas turbine apparatus, gas having a high temperature and high pressure from a combustor flows into a turbine unit and collides with a blade of a turbine rotor in the turbine unit to rotate a turbine output shaft.

In order to increase an efficiency of the gas turbine apparatus, a temperature of a turbine inlet is increased, but a cooling performance of the gas turbine apparatus is important when the temperature of the turbine inlet is high.

Specifically, since the turbine rotor and a vane of the gas turbine apparatus exposed to a high temperature require sufficient cooling to obtain structural stability and an extended life, technologies for cooling the gas turbine apparatus are being actively developed.

For example, Korean Patent Application document, KR 2010-0106617, discloses a technology for cooling a rotor of a compressor by using cooling air.

SUMMARY

One or more exemplary embodiments provide a gas turbine apparatus capable of realizing high efficiency.

According to an aspect of an exemplary embodiment, there is provided a gas turbine apparatus including: a turbine unit including an output shaft; a cooling gas generation unit including a rotation shaft which receives power from the output shaft through the rotation shaft and generates a compressed cooling gas; a first duct unit which transfers the generated compressed cooling gas to the turbine unit; a clutch unit which controls a power transfer connection between the output shaft and the rotation shaft; and a control unit which controls the transferring of the generated compressed cooling gas.

The turbine unit may comprise at least one expanding stage portion.

At least one temperature sensor may be disposed at the turbine unit.

The at least one temperature sensor may measure a temperature of a shaft of a rotor, a temperature of a blade, and a temperature of a vane, and transmits the measured temperature to the control unit.

The cooling gas generation unit may include at least one compressor that receives power from the rotation shaft and generates the compressed cooling gas.

The at least one compressor may include a plurality of compressors, wherein the plurality of compressors generate compressed cooling gases having different pressures.

A number of the plurality of compressors may correspond to a number of at least one expanding stage portion of the turbine unit.

The gas turbine apparatus may further include an electric generation unit which receives the power from the output shaft and generates electric power.

The gas turbine apparatus may further include at least one first valve installed at the first duct unit, wherein the control unit controls the clutch unit and the at least one valve to control the transferring of the generated compressed cooling gas.

The control unit may monitor a temperature of the turbine unit, and if the temperature of the turbine unit exceeds a predetermined temperature, the control unit may open the at least one first valve and may operate the clutch unit to connect the output shaft and the rotation shaft The gas turbine apparatus may further include: a gas compression unit which receives the power from the output shaft and compresses gas flowing into a combustor; and a second duct unit which extracts and transfers a part of the compressed gas to the turbine unit.

The second duct unit may connect with the first duct unit.

The gas compression unit may include at least one compression stage portion, and wherein a number of the at least one compression stage portion corresponds to a number of at least one expanding stage portion of the turbine unit.

The gas compression unit may further include a combustion unit which generates combustion by using a compressed gas from the gas compression unit.

The gas compression unit may further include at least one second valve installed at the second duct unit, wherein the control unit may monitor a temperature of the turbine unit, and if the temperature of the turbine unit exceeds a predetermined temperature, the control unit may open the at least one second valve and operate the clutch unit to connect the output shaft and the rotation shaft.

The gas compression unit may further include: a gas compression unit which receives the power from the output shaft and compresses gas flowing into a combustor; a second duct unit which extracts and transfers a part of the compressed gas to the turbine unit to cool the turbine unit; at least one first valve installed at the first duct unit; and at least one second valve installed at the second duct unit, wherein the control unit controls the clutch unit and the at least one first valve and at least one second valve to control the transferring of the generated compressed cooling gas.

The control unit may monitor a temperature of the turbine unit, and if the temperature of the turbine unit exceeds a predetermined temperature, the control unit may open the at least one first valve and the at least one second valve and may operate the clutch unit to connect the output shaft and the rotation shaft.

According to an aspect of an exemplary embodiment, there is provided gas turbine apparatus including: a turbine unit which generates power using a compressed gas; a cooling gas generation unit which generates a cooling gas to cool the turbine unit using at least a portion of the power which is generated at and transferred from the turbine unit; and a control unit which controls the cooling gas generation unit to generate the cooling gas by measuring a temperature of the turbine unit and supply the generated cooling gas to the turbine unit, wherein the cooling gas generation unit does not use a power source other than the turbine unit to generate the cooling gas.

The gas turbine apparatus may also include an output shaft connected to the turbine unit; a rotation shaft connected to the cooling gas generation unit; and a clutch which connects the output shaft and the rotation shaft to supply the at least a portion of the power from the turbine unit to the cooling gas generation unit, according to control of the control unit.

The gas turbine apparatus may also include a gas compression unit which generates the compressed gas, and supplies a portion of the compressed gas to the turbine to cool the turbine unit, according to control of the control unit.

BRIEF DESCRIPTION OF THE DRAWINGS

The above and/or other aspects will become more apparent by describing in detail exemplary embodiments thereof with reference to the attached drawings, in which.

DETAILED DESCRIPTION OF THE EXEMPLARY EMBODIMENTS

Figure 1:
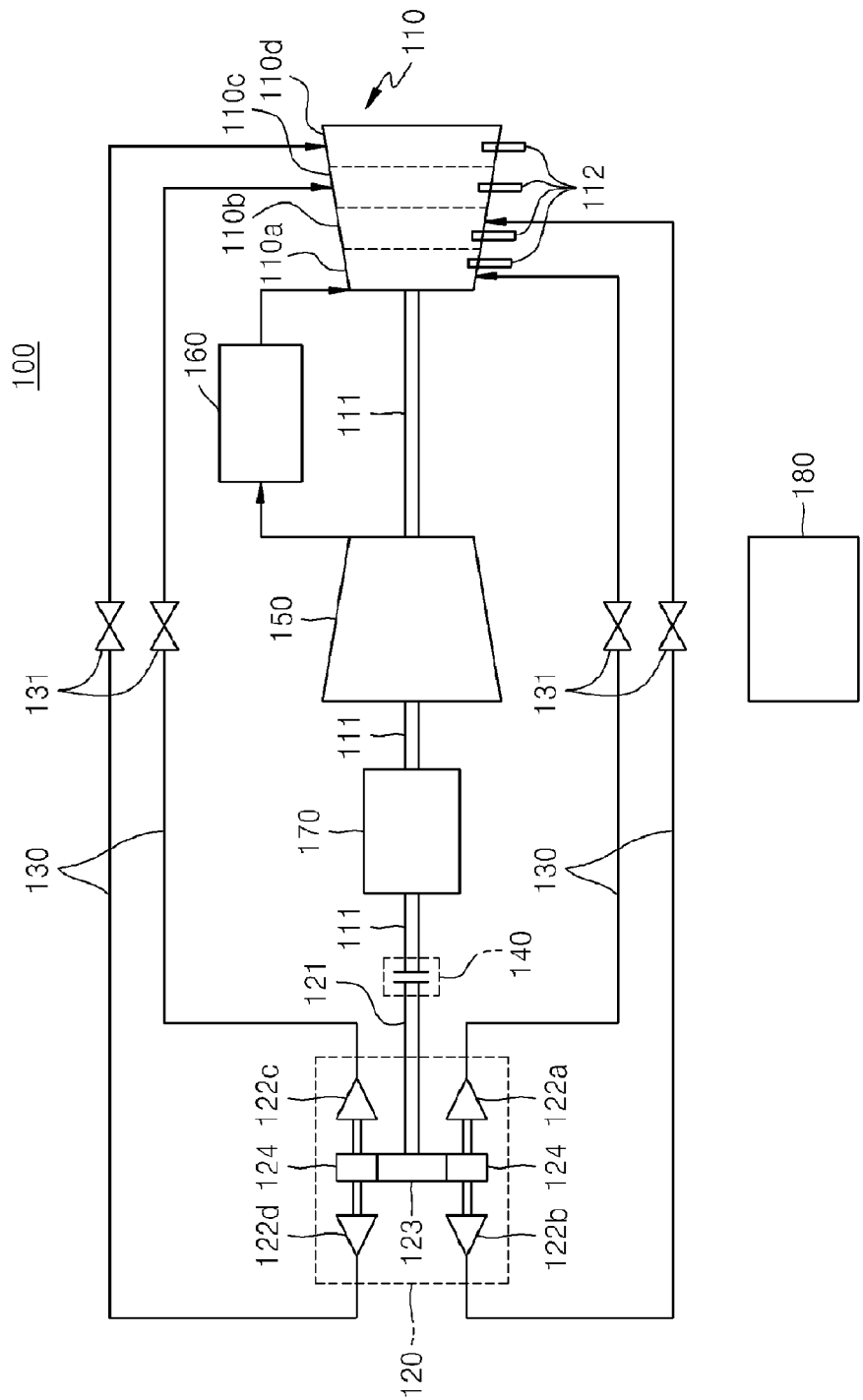
FIG. 1 is a diagram of a gas turbine apparatus according to an exemplary embodiment.

Hereinafter, one or more embodiments will be described in detail with reference to accompanying drawings. Also, in drawings, same reference numerals denote same elements to avoid repetition.

FIG. 1 is a diagram of a gas turbine apparatus 100 according to an exemplary embodiment.

The gas turbine apparatus 100 includes a turbine unit 110, a cooling gas generation unit 120, a first duct unit 130, a clutch unit 140, a gas compression unit 150, a combustion unit 160, an electric generation unit 170, and a control unit 180. Here, the turbine unit 110, the cooling gas generation unit 120, the first duct unit 130, and the clutch unit 140 together provide direct cooling of various components of the gas turbine apparatus 100 and constitute a gas turbine cooling system of the gas turbine apparatus 100.

The turbine unit 110 has a multi-stage structure having four (4) distinctive expanding units 110a, 110b, 110c and 110d. In other words, the turbine unit 110 includes a first expanding stage portion 110a, a second expanding stage portion 110b, a third expanding stage portion 110c, and a fourth expanding stage portion 110d, in an order from a high pressure stage to a low pressure stage.

In the current exemplary embodiment, the turbine unit 110 includes the first, second, third and fourth expanding stage portions 110a, 110b, 110c and 110d, but the number of expanding units of the turbine unit 110 is not limited thereto. For example, the number of expanding stage portions may be one (1), two (2), five (5), or ten (10).

A rotor (not shown), blades (not shown), and vanes (not shown), which are well known, are disposed inside each expanding stage of the turbine unit 110. Also, the turbine unit 110 includes an output shaft 111 connected to a shaft of the rotor inside the turbine unit 110.

Also, a temperature sensor 112 is installed in the each expanding stage of the turbine unit 110. The temperature sensor 112 measures a temperature inside the turbine unit 110, for example, a temperature of the shaft of the rotor, a temperature of a blade, and a temperature of a vane, and transmits the measured temperature to the control unit 180.

The cooling gas generation unit 120 generates a compressed cooling gas for cooling the turbine unit 110.

The cooling gas generation unit 120 includes a rotation shaft 121, four compressors 122a, 122b, 122c, and 122d, a first gear 123, and a second gear 124.

The compressors 122a, 122b, 122c, and 122d generate a compressed cooling gas by compressing air, and may be a general turbo compressor, a rotary compressor, or a reciprocating compressor.

The first gear 123 is installed on the rotation shaft 121, and the second gear 124 is geared to the first gear 123. In the current exemplary embodiment, the first and second gears 123 and 124 have a spur gear type.

The rotation shaft 121 rotates the first gear 123 installed on the rotation shaft 121 by receiving power from the clutch unit 140. When the first gear 123 rotates, the second gear 124 that is geared to the first gear 123 also rotates. When the second gear 124 rotates, the four compressors 122a, 122b, 122c, and 122d connected to a shaft of the second gear 124 are driven by receiving power.

According to the current exemplary embodiment, the first and second gears 123 and 124 are geared with each other to transfer power of the rotation shaft 121 to the compressors 122a, 122b, 122c, and 122d, but a configuration of transferring power to the compressors 122a, 122b, 122c, and 122d is not limited thereto. For example, a third gear and a fourth gear may be additionally provided in addition to the first and second gears 123 and 124, and types of the first and second gears 123 and 124 may be a helical gear type, a double helical gear type, or a bevel gear type. Also, power may be transferred by using a belt driven method, a chain driven method, or a friction wheel method, instead of a gear driven method.

The cooling gas generation unit 120 according to the current exemplary embodiment includes four compressors 122a, 122b, 122c, and 122d, but the number of compressors included in the cooling gas generation unit 120 is not limited thereto. For example, the cooling gas generation unit 120 may include one (1), two (2), three (3), five (5), or six (6) compressors. If the turbine unit 110 includes expanding stage portions in a multi-stage, the number of compressors may be determined based on the number of expanding stage portions.

The first duct unit 130 transfers the compressed cooling gas generated by the cooling gas generation unit 120 to the turbine unit 110 to cool down the turbine unit 110.

Accordingly, one end of the first duct unit 130 is connected with each of the outlets of the compressors 122a, 122b, 122c, and 122d, and the other end of the first duct unit 130 is connected with the inside of the turbine unit 110. Here, the other end of the first duct unit 130 is connected with each of the first, second, third and fourth expanding stage portions 110a, 110b, 110c and 110d of the turbine unit 110, and thus transfers the cooling gas to the first through fourth expanding stage portions 110a, 110b, 110c and 110d.

Valves 131 are installed on the first duct unit 130. The valves 131 may be electronic valves that are opened or closed upon receiving a command from the control unit 180 or may be manually opened or closed by a user.

The clutch unit 140 controls a power transfer connection of the output shaft 111 and the rotation shaft 121. In other words, the clutch unit 140 transfers power by connecting the output shaft 111 and the rotation shaft 121, or blocks power by breaking a connection between the output shaft 111 and the rotation shaft 121.

The clutch unit 140 may be configured to be automatically controlled upon receiving a command from the control unit 180, or may be manually controlled by the user.

The clutch unit 140 may have a well-known clutch structure. For example, the clutch unit 140 may be a claw clutch, a friction clutch, a magnetic clutch, a fluid clutch, or a centrifugal clutch.

The gas compression unit 150 compresses air flowing into the combustion unit 160, and may be a turbo compressor, a rotary compressor, or a reciprocating compressor.

The gas compression unit 150 is driven by receiving power from the output shaft 111. In other words, a driving shaft of the gas compression unit 150 is integrally formed with the output shaft 111 and is rotated upon receiving power.

The combustion unit 160 generates gas having a high temperature and high pressure, which is combusted by generating combustion after injecting a fuel to compressed air from the gas compression unit 150. Any well-known combustor used in a turbine apparatus may be used as the combustion unit 160.

The electric generation unit 170 generates electric power upon receiving power from the output shaft 111. A driving shaft of the electric generation unit 170 according to the current embodiment is integrally formed with the output shaft 111, and is rotated by receiving power.

The gas turbine apparatus 100 according to the current embodiment includes the electric generation unit 170, but alternatively, the gas turbine apparatus 100 may not include the electric generation unit 170. In this case, generated power may be used to drive another mechanical apparatus or directly converted to heat energy.

The control unit 180 includes an electric circuit or an integrated circuit chip, and controls other components of the gas turbine apparatus by performing operations according to a program operating the gas turbine apparatus 100. Detailed operations of the gas turbine apparatus 100 will be described in detail below.

Operations of the gas turbine apparatus 100 according to the current embodiment will now be described in detail with reference to FIG. 1

When a user inputs a power generation command to the control unit 180 to generate power, the control unit 180 drives the gas compression unit 150 to compress gas and transfer the compressed gas to the combustion unit 160, by using an initial starter motor (not shown).

The compressed gas transferred to the combustion unit 160 is combusted with the fuel, thereby generating a combustion gas having a high temperature and high pressure. The combustion gas moves to the turbine unit 110 and expands, thereby generating power. Then, the turbine unit 110 drives the electric generation unit 170 through the output shaft 111 to generate power. In addition, the turbine unit 110 drives the gas compression unit 150 through the output shaft 111 such that the gas turbine apparatus 100 is continuously driven.

The temperature sensor 112 installed in the turbine unit 110 measures a temperature inside the turbine unit 110, and transmits the measured temperature to the control unit 180.

The control unit 180 monitors the temperature of the turbine unit 110, and when the temperature exceeds a predetermined temperature, opens the valves 131 of the first duct unit 130 and operates the clutch unit 140 so as to connect the output shaft 111 and the rotation shaft 121.

When the rotation shaft 121 rotates upon receiving power from the output shaft 111, the power is transferred to the compressors 122a, 122b, 122c, and 122d through the first and second gears 123 and 124, and the compressors 122a, 122b, 122c, and 122d generate compressed cooling gases having different pressures. Here, the pressures of the compressed cooling gases generated by the compressors 122a, 122b, 122c, and 122d are determined respectively according to pressures of the first through fourth expanding stage portions 110a, 110b, 110c and 110d of the turbine unit 110.

The compressed cooling gases generated by the compressors 122a, 122b, 122c, and 122d are transferred respectively to the first through fourth expanding stage portions 110a, 110b, 110c and 110d of the turbine unit 110 through the first duct unit 130, thereby cooling the turbine unit 110.

The control unit 180 continuously monitors the temperature of the turbine unit 110, and when the temperature is below the predetermined temperature as a cooling operation is sufficiently performed in the turbine unit 110, closes the valves 131 and drives the clutch unit 140 to disconnect the output shaft 111 and the rotation shaft 121, thereby stopping driving of the cooling gas generation unit 120.

As described above, the temperature of the turbine unit 110 is monitored while driving the gas turbine apparatus 100, and the clutch unit 140 is driven if it is required to cool down the turbine unit 110, thereby suitably cooling down the turbine unit 110.

As such, since the gas turbine apparatus 100 according to an exemplary embodiment may drive the compressors 122a, 122b, 122c, and 122d of the cooling gas generation unit 120 by receiving power from the output shaft 111 of the turbine unit 110, an additional electric motor for driving the compressors 122a, 122b, 122c, and 122d is not required, and thus a structure of the gas turbine apparatus 100 is simple and manufacturing costs are reduced. In addition, an efficiency of the gas turbine apparatus 100 may be increased since an energy loss caused while converting electric energy and mechanical energy according to using of an electric motor is removed.

Also, since the gas turbine apparatus 100 according to an exemplary embodiment includes the clutch unit 140 for connecting or disconnecting the output shaft 111 and the rotation shaft 121 for power transfer control, the gas turbine apparatus 100 has a relatively simple structure and a quick response speed, and thus cooling performance and control performance may be improved. In this case, a quick action may be taken according to the temperature of the turbine unit 110, and thus a life of the turbine unit 110 is increased by preventing overheating of the turbine unit 110 and driving times of the compressors 122a, 122b, 122c, and 122d may be optimized, thereby increasing an overall efficiency of the gas turbine apparatus 100.

Hereinafter, a gas turbine apparatus 200 according to another exemplary embodiment will now be described in detail with reference to FIG. 2, wherein differences between the gas turbine apparatuses 100 and 200 are mainly described.

Figure 2:
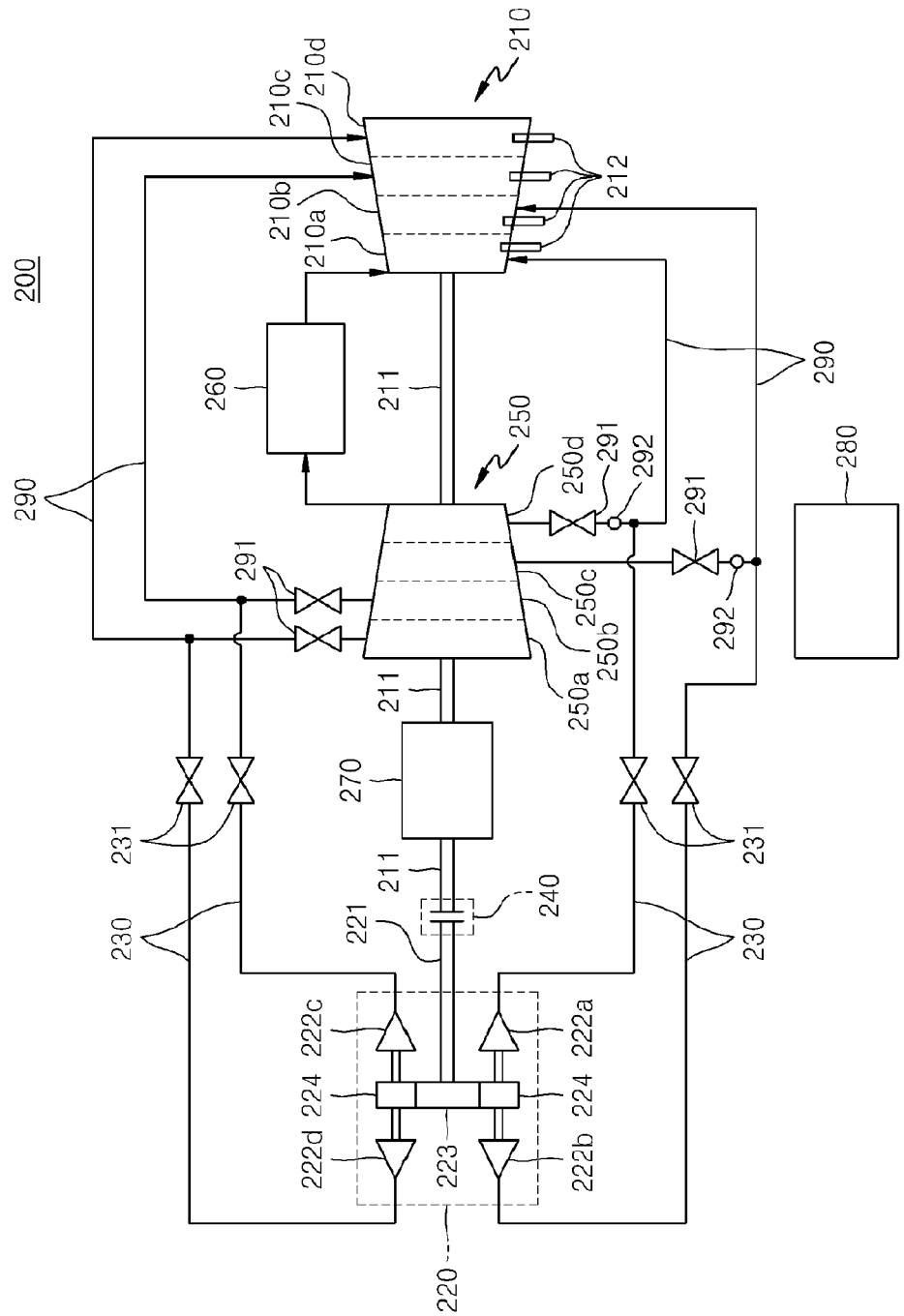
FIG. 2 is a diagram of a gas turbine apparatus according to another exemplary embodiment.

FIG. 2 is a diagram of the gas turbine apparatus 200 according to another exemplary embodiment.

The gas turbine apparatus 200 according to the another exemplary embodiment includes a turbine unit 210, a cooling gas generation unit 220, a first duct unit 230, a clutch unit 240, a gas compression unit 250, a combustion unit 260, an electric generation unit 270, a control unit 280, and a second duct unit 290.

Here, structures of the turbine unit 210, the cooling gas generation unit 220, the clutch unit 240, the combustion unit 260, the electric generation unit 270, and the control unit 280 are respectively identical to those of the turbine unit 110, the cooling gas generation unit 120, the clutch unit 140, the combustion unit 160, the electric generation unit 170, and the control unit 180 described above with reference to FIG. 1.

In other words, structures of a first expanding stage portion 210a, a second expanding stage portion 210b, a third expanding stage portion 210c, a fourth expanding stage portion 210d, an output shaft 211, and a temperature sensor 212 of the turbine unit 210 are respectively identical to those of the first expanding stage portion 110a, the second expanding stage portion 110b, the third expanding stage portion 110c, the fourth expanding stage portion 110d, the output shaft 111, and the temperature sensor 112 described above with reference to FIG. 1. Also, structures of a rotation shaft 221, compressors 222a, 222b, 222c, and 222d, a first gear 223, and a second gear 224 of the cooling gas generation unit 220 are respectively identical to those of the rotation shaft 121, the compressors 122a, 122b, 122c, and 122d, the first gear 123, and the second gear 124 of the cooling gas generation unit 120 described above with reference to FIG. 1. Also, structures of valves 231 of the first duct unit 230 are identical to those of the valves 131 of the first duct unit 130 described above with reference to FIG. 1.

The gas compression unit 250 of the gas turbine apparatus 200 includes compression stage portions in a multi-stage. In other words, the gas compression unit 250 includes a first compression stage portion 250a, a second compression stage portion 250b, a third compression stage portion 250c, and a fourth compression stage portion 250d in an order from a low pressure stage to a high pressure stage.

Moreover, the gas turbine apparatus 200 includes the second duct unit 290. Here, one end of the second duct unit 290 is connected with each of the first, second, third and fourth compression stage portions 250a, 250b, 250c and 250d, and the other end of the second duct unit 290 is connected with each of the first, second, third and fourth expanding stage portions 210a, 210b, 210c and 210d of the turbine unit 210 so as to cool down the first, second, third and fourth expanding stage portions 210a, 210b, 210c and 210d. In other words, the second duct unit 290 extracts and transfers some of the compressed gases from each of the first, second, third and fourth compression stage portions 250a, 250b, 250c and 250d to corresponding expanding stage portions of the turbine unit 210, thereby cooling down the turbine unit 210.

Valves 291 are installed on the second duct unit 290, and may be configured as electronic valves to be opened or closed upon receiving a direction from the control unit 280, or may be configured to be manually opened or closed by a user. Also, coolers 292 are disposed at regions of the second duct unit 290 that are connected to the third and fourth compression stage portions 250c and 250d, wherein the coolers 292 cool down gases from the third and fourth compression stage portions 250c and 250d having a relatively high temperature in the gas compression unit 250.

Also, the second duct unit 290 is configured to be connected with the first duct unit 230.

Hereinafter, operations of the gas turbine apparatus 200 according to another exemplary embodiment will now be described in detail with reference to FIG. 2.

When the user inputs a power generation command to the control unit 280 to generate power, the control unit 280 drives the gas compression unit 250 to generate a compressed gas by using an initial starter motor (not shown), and transfers the compressed gas to the combustion unit 260.

The compressed gas transferred to the combustion unit 260 generates a combustion gas having a high temperature and high pressure by being combusted with a fuel, and the combustion gas moves to the turbine unit 210 and expands to generate power. Then, the turbine unit 210 drives the electric generation unit 270 through the output shaft 211 to generate electric power, and drives the gas compression unit 250 through the output shaft 211. As such, the gas turbine apparatus 200 is continuously driven.

The temperature sensor 212 installed in the turbine unit 210 measures a temperature inside the turbine unit 210 in real time, and transmits the measured temperature to the control unit 280.

The control unit 280 monitors the temperature of the turbine unit 210, and when the temperature exceeds a predetermined temperature, opens the valves 231 of the first duct unit 230 and the valves 291 of the second duct unit 290 and drives the clutch unit 240 to connect the output shaft 211 and the rotation shaft 221.

When the rotation shaft 221 is rotated by receiving power from the output shaft 211, the power is transmitted to the four compressors 222a, 222b, 222c and 222d through the first and second gears 223 and 224, and the compressors 222a, 222b, 222c and 222d generate compressed cooling gases having different pressures. The compressed cooling gases generated by the compressors 222a, 222b, 222c and 222d are respectively transferred to the first through fourth expanding stage portions 210a, 210b, 210c and 210d of the turbine unit 210 through the first and second duct units 230 and 290, thereby cooling down the turbine unit 210.

The control unit 280 continuously monitors the temperature of the turbine unit 210, and when the temperature reaches below the predetermined temperature as the turbine unit 210 is sufficiently cooled down, closes the valves 231 and 291 and drives the clutch unit 240 to disconnect the output shaft 211 and the rotation shaft 221, thereby stopping the driving of the cooling gas generation unit 220.

According to the current exemplary embodiment, the valves 291 installed in the second duct unit 290 are opened only when the temperature of the turbine unit 210 exceeds the predetermined temperature, but alternatively, the valves 291 installed in the second duct unit 290 may be always opened so that the cooling of the turbine unit 210 is smoothly performed.

As such, since the gas turbine apparatus 200 according to the another exemplary embodiment may drive the compressors 222a, 222b, 222c and 222d of the cooling gas generation unit 220 by receiving power from the output shaft 211 of the turbine unit 210, an additional electric motor for driving the compressors 222a, 222b, 222c and 222d is not required, and thus a structure of the gas turbine apparatus 200 is simple and manufacturing costs are reduced. In addition, an efficiency of the gas turbine apparatus 200 may be increased since an energy loss caused while converting electric energy and mechanical energy according to using of an electric motor is removed.

Also, since the gas turbine apparatus 200 according to the another exemplary embodiment includes the clutch unit 240 for connecting or disconnecting the output shaft 211 and the rotation shaft 221 for power transfer control, the gas turbine apparatus 200 has a relatively simple structure and a quick response speed, and thus cooling performance and control performance may be improved. In this case, a quick action may be taken according to the temperature of the turbine unit 210, and thus a life of the turbine unit 210 is increased by preventing overheating of the turbine unit 210 and driving times of the compressors 222a, 222b, 222c and 222d may be optimized, thereby increasing an overall efficiency of the gas turbine apparatus 200.

Also, since the gas turbine apparatus 200 according to the another exemplary embodiment cools down the turbine unit 210 by not only using the cooling gas generation unit 220, but also using some gases, which are compressed by and extracted from the first through fourth compression stage portions 250a, 250b, 250c and 250d of the gas compression unit 250 and transferred to each stage portion of the turbine unit 210 through the second duct unit 290, cooling efficiency may be further increased compared to the previous embodiment where the turbine unit 110 is cooled down by only using the cooling gas generation unit 120.

According to one or more embodiments, a gas turbine apparatus capable of effectively cooling down a turbine unit while increasing efficiency may be realized.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A gas turbine apparatus comprising:
a turbine unit comprising an output shaft;
a cooling gas generation unit, comprising a rotation shaft, configured to receive power from the output shaft through the rotation shaft, and configured to generate a compressed cooling gas;
a first duct unit configured to transfer the generated compressed cooling gas to the turbine unit;
a clutch unit configured to control a power transfer connection between the output shaft and the rotation shaft; and
a control unit configured to control the transferring of the generated compressed cooling gas,
wherein the cooling gas generation unit comprises a plurality of compressors configured to generate compressed cooling gases having different pressures.

2. The gas turbine apparatus of claim 1, wherein the turbine unit comprises at least one expanding stage portion.

3. The gas turbine apparatus of claim 1, wherein at least one temperature sensor is disposed at the turbine unit.

4. The gas turbine apparatus of claim 3, wherein the at least one temperature sensor is configured to measure a temperature of a shaft of a rotor, a temperature of a blade, and a temperature of a vane, and configured to transmit the measured temperature to the control unit.

5. The gas turbine apparatus of claim 1, wherein a number of the plurality of compressors corresponds to a number of at least one expanding stage portion of the turbine unit.

6. The gas turbine apparatus of claim 1, further comprising an electric generation unit configured to receive the power from the output shaft and configured to generate electric power.

7. The gas turbine apparatus of claim 1, further comprising at least one first valve installed at the first duct unit,
wherein the control unit is configured to control the clutch unit and the at least one first valve to control the transferring of the generated compressed cooling gas.

8. The gas turbine apparatus of claim 7, wherein the control unit is configured to monitor a temperature of the turbine unit, and if the temperature of the turbine unit exceeds a predetermined temperature, the control unit opens the at least one first valve and operates the clutch unit to connect the output shaft and the rotation shaft.

9. The gas turbine apparatus of claim 1, further comprising:
a gas compression unit configured to receive the power from the output shaft and compresses gas flowing into a combustor;
a second duct unit configured to extract and configured to transfer a part of the compressed gas to the turbine unit to cool the turbine unit;
at least one first valve installed at the first duct unit; and
at least one second valve installed at the second duct unit,
wherein the control unit is configured to control the clutch unit, the at least one first valve and at least one second valve to control the transferring of the generated compressed cooling gas.

10. The gas turbine apparatus of claim 9, wherein the control unit is configured to monitor a temperature of the turbine unit, and if the temperature of the turbine unit exceeds a predetermined temperature, the control unit opens the at least one first valve and the at least one second valve and operates the clutch unit to connect the output shaft and the rotation shaft.

11. A gas turbine apparatus comprising:
a turbine unit comprising an output shaft;
a cooling gas generation unit, comprising a rotation shaft, configured to receive power from the output shaft through the rotation shaft, and configured to generate a compressed cooling gas;
a first duct unit configured to transfer the generated compressed cooling gas to the turbine unit;
a clutch unit configured to control a power transfer connection between the output shaft and the rotation shaft;
a control unit configured to control the transferring of the generated compressed cooling gas;
a gas compression unit configured to receive the power from the output shaft and configured to compress gas flowing into a combustor; and
a second duct unit configured to extract and configured to transfer a part of the compressed gas to the turbine unit to cool the turbine unit,
wherein the second duct unit connects with the first duct unit.

12. The gas turbine apparatus of claim 11, wherein the gas compression unit comprises at least one compression stage portion, and
wherein a number of the at least one compression stage portion corresponds to a number of at least one expanding stage portion of the turbine unit.

13. The gas turbine apparatus of claim 11, further comprising a combustion unit configured to generate combustion by using a compressed gas from the gas compression unit.

14. The gas turbine apparatus of claim 11, further comprising at least one second valve installed at the second duct unit,
wherein the control unit is configured to monitor a temperature of the turbine unit, and if the temperature of the turbine unit exceeds a predetermined temperature, the control unit opens the at least one second valve and operates the clutch unit to connect the output shaft and the rotation shaft.

15. A gas turbine apparatus comprising:
a turbine unit configured to generate power using a compressed gas;
a cooling gas generation unit configured to generate a cooling gas to cool the turbine unit; and
a control unit configured to control the cooling gas generation unit to generate the cooling gas to supply the generated cooling gas to the turbine unit,
wherein the cooling gas generation unit comprises a plurality of compressors configured to generate compressed cooling gases having different pressures.

16. The gas turbine apparatus of claim 15, further comprising:
an output shaft connected to the turbine unit;
a rotation shaft connected to the cooling gas generation unit; and a clutch configured to connect the output shaft and the rotation shaft to supply the at least a portion of the power from the turbine unit to the cooling gas generation unit, according to control of the control unit.

17. The gas turbine apparatus of claim 16, further comprising a gas compression unit configured to generate the compressed gas, and configured to supply a portion of the compressed gas to the turbine to cool the turbine unit, according to control of the control unit.

* * * * *